United States Patent
Garcia et al.

(10) Patent No.: US 6,240,476 B1
(45) Date of Patent: May 29, 2001

(54) DYNAMIC ALLOCATION OF BUS MASTER CONTROL LINES TO PERIPHERAL DEVICES

(75) Inventors: Ray Garcia, Boca Raton; Stephen E. Still, Lake Worth; Kendall A. Honeycutt, Boca Raton, all of FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/137,490

(22) Filed: Aug. 21, 1998

(51) Int. Cl.[7] .............................. G06F 13/36; G06F 13/14
(52) U.S. Cl. ........................ 710/107; 710/200; 710/220
(58) Field of Search ............................... 710/1, 200, 220, 710/240, 241, 242, 243, 244, 107

(56) References Cited

U.S. PATENT DOCUMENTS

| | | | |
|---|---|---|---|
| 4,839,640 | * 6/1989 | Ozer et al. | 340/825.31 |
| 5,455,926 | * 10/1995 | Keele et al. | 395/404 |
| 5,499,346 | * 3/1996 | Amini et al. | 710/128 |
| 5,560,016 | * 9/1996 | Fiebrich et al. | 395/728 |
| 5,862,353 | * 1/1999 | Revilla et al. | 395/287 |
| 5,907,553 | * 5/1999 | Kelly et al. | 370/433 |
| 6,009,275 | * 12/1999 | DeKoning et al. | 395/727 |
| 6,032,178 | * 2/2000 | Bacigalupo et al. | 709/208 |

* cited by examiner

*Primary Examiner*—Dieu-Minh T. Le
*Assistant Examiner*—Tim Vo
(74) *Attorney, Agent, or Firm*—Fleit, Kain, Gibbons, Gutman & Bongini P.L.; Stephen C. Bongini

(57) ABSTRACT

A computer system includes a system bus, peripheral devices, bus control logic having bus control lines for bus master operation, and an allocation control circuit. The allocation control circuit is connected to at least one of the bus control lines and at least two of the peripheral devices. The connected bus control line is coupled to one of the connected peripheral devices by the allocation unit so that the one connected peripheral device can operate as a bus master on the system bus. In a preferred embodiment, the allocation control circuit includes switches that are controlled by the system software. Also provided is a method of allocating bus master control lines to peripheral devices. According to the method, the bus master control lines and the peripheral devices are connected to an allocation unit. It is determined which peripheral devices to connect to which bus master control lines, and the allocation unit is directed to couple each bus master control line to one of the peripheral devices so that the selected peripheral devices can operate as bus masters. In a preferred method, the determination is based on user preferences and/or system-detected peripheral devices, and the system software controls the allocation unit.

22 Claims, 2 Drawing Sheets

DYNAMIC ALLOCATION OF BUS MASTER CONTROL LINES TO PERIPHERAL DEVICES

BACKGROUND OF THE INVENTION

1. Field of the Invention

The present invention relates to computer systems, and more specifically to a computer system in which bus master control lines can be dynamically allocated to connected peripheral devices.

2. Description of Related Art

The PCI (Peripheral Component Interconnect) bus is a standardized local bus that is used for communication between a CPU and its peripherals. The PCI bus allows for system board connection of high-speed peripherals and for connecting add-in cards to the system board. The PCI bus now dominates the desktop PC (personal computer) market as the primary way of connecting peripherals to the CPU, and variants of the standard PCI bus have evolved for industrial, compact, and mobile applications. The PCI bus and connected devices operate in accordance with the PCI specification, which is published by the PCI Special Interest Group. Because it is processor independent, any CPU or peripheral can be connected to the bus. In accordance with revision 2.1 of the specification, the PCI bus can provide a 32 or 64 bit data path that operates at a 33 or 66 MHz clock rate.

In a conventional PC, a system board houses a central processing unit CPU and its associated main memory, which is typically a large block of DRAM. A cache of faster SRAM memory, a logic control chip set, a CPU bus, and a PCI bus are also provided on the system board. Peripherals (such as a network interface controller, a graphics controller, and a sound controller) are connected to the PCI bus in the form of add-in cards. An ISA bridge may also be provided to allow ISA bus-based peripherals to be connected to the computer system. Additionally, the system board usually has ports for input and output devices such as a keyboard, a mouse, and a printer.

The PCI bus provides bus request lines and bus grant lines that allow devices connected to the bus to operate as bus masters. For a peripheral device to act as a bus master, the device must have bus master capabilities (i.e., the ability to request access to the PCI bus and then to generate the signals that are necessary to complete the data transfer in accordance with the PCI specification). Additionally, a unique bus request/grant line pair must be provided for the device so that bus requests can be generated independent of other bus activity.

While a large number of devices could theoretically be operated as bus masters, conventional logic control chip sets offer only a limited number of PCI bus request/grant line pairs. For example, the widely used logic chip sets manufactured by Intel Corporation (Santa Clara, Calif.) provide only four PCI bus request/grant line pairs. Furthermore, in conventional systems, the bus request/grant line pairs are hard wired to specific system board devices or add-in card slots. If a bus request/grant line pair is wired to a special system board device such as a universal serial bus (USB) controller, the number of add-in card slots available for bus master devices is reduced.

For example, the single board computer design guidelines (from the PCI Industrial Computers Manufacturing Group) allow up to four PCI bus master devices to be connected as add-in cards. However, devices on the computer board itself may also need to operates as bus masters. In such a conventional computer system, even when the on-board device is not needed in the present system configuration (e.g., if no peripheral devices are connected to the USB), the number of other devices that can operate as bus masters is limited. In other words, regardless of which devices are actually installed and being used in the system, the only way to change the allocation of the bus request/grant line pairs is to change the system board.

SUMMARY OF THE INVENTION

In view of these drawbacks, it is an object of the present invention to remove the above-mentioned drawbacks and to provide a computer system in which bus master control lines can be dynamically allocated to connected peripheral devices. The bus request/grant line pairs of the system control logic and the line pairs for physical devices are selectively coupled through an allocation control circuit. Based on a set of enable signals, the allocation control circuit allocates the bus request/grant line pairs to specific devices in the system. In this manner, the bus master control lines can be dynamically directed to the appropriate devices in accordance with the present configuration of the computer system.

According to one embodiment of the present invention, a computer system is provided that includes a system bus, peripheral devices, bus control logic having bus control lines for bus master operation, and an allocation control circuit. The allocation control circuit, which is connected to at least one of the bus control lines from the bus control logic and at least two of the peripheral devices, couples the connected bus control line to one of the connected peripheral devices so that the one connected peripheral device can operate as a bus master on the system bus. In a preferred embodiment, the allocation control circuit includes switches that are controlled by the system software.

Another embodiment of the present invention provides a method of allocating bus master control lines to peripheral devices connected to a bus. According to the method, the bus master control lines and the peripheral devices are connected to an allocation unit. It is determined which peripheral devices to connect to which bus master control lines, and the allocation unit is directed to couple each bus master control line to one of the peripheral devices so that the selected peripheral devices can operate as bus masters on the bus. In one preferred method, the determination of which peripheral devices to connect to which bus master control lines is performed based on user preferences and/or system-detected peripheral devices, and the system software controls the allocation unit by supplying enable signals that specify which bus master control lines to coupled to which peripheral devices.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 1:
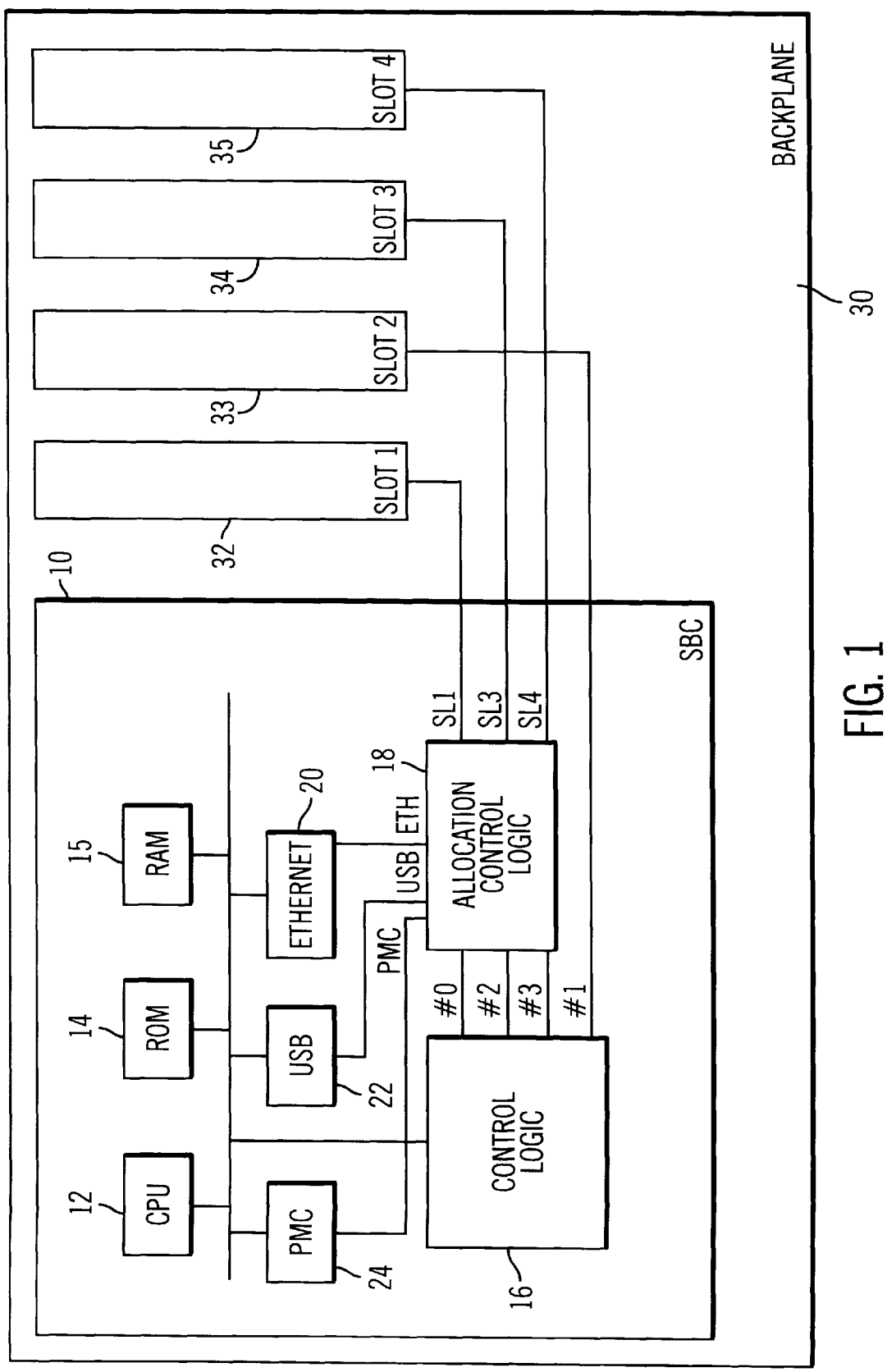
FIG. 1 is a block diagram showing a computer system having dynamically allocated bus master control lines in accordance with an embodiment of the present invention.

FIG. 1 is a block diagram of a computer system according to an embodiment of the present invention. In the embodiment shown, the bus master allocation control circuit of the present invention is applied to the PCI bus of a single board computer (SBC) system. With an SBC, a complete computer is built on a single card 10 and the card is connected to a passive backplane 30 using a connection slot. The card 10 includes a central processing unit (CPU) 12, read only memory (ROM) 14, and random access memory (RAM) 15. A PCI bus couples the CPU 12 with an ethernet port 20, a universal serial bus (USB) port 22, and a PCI mezzanine (i.e., daughter) card connector 24.

Additionally, a logic control chip set 16 is coupled to the CPU 12 and the PCI bus. The passive backplane 30 has connection slots 32 through 35 for connecting add-in card based peripheral devices to the PCI bus of the system. An allocation control unit 18 is connected between the PCI bus request/grant line pairs from the logic control chip set 16 and the request/grant line pairs for devices connected to the bus. With the exception of the added allocation control unit, the computer system operates in a conventional manner so a description of the general operation of the system of FIG. 1 is omitted.

Illustratively, the computer system of FIG. 1 has four request/grant line pairs, four PCI add-in card connection slots, an ethernet port, a USB port, and a PCI mezzanine card connector. The second request/grant line pair (REQ1/GNT1) is hardwired directly to the second PCI slot, and the remaining request/grant line pairs are allocated to the remaining slots and on-board devices by the allocation control unit. In particular, the first request/grant line pair (REQ0/GNT0) is connected to the first PCI slot or the USB connector; the third request/grant line pair (REQ2/GNT2) is connected to the third PCI slot, the USB port, or the mezzanine connecter; and the fourth request/grant line pair (REQ3/GNT3) is connected to the third PCI slot, the fourth PCI slot, the USB port, or the ethernet port.

Figure 2A:
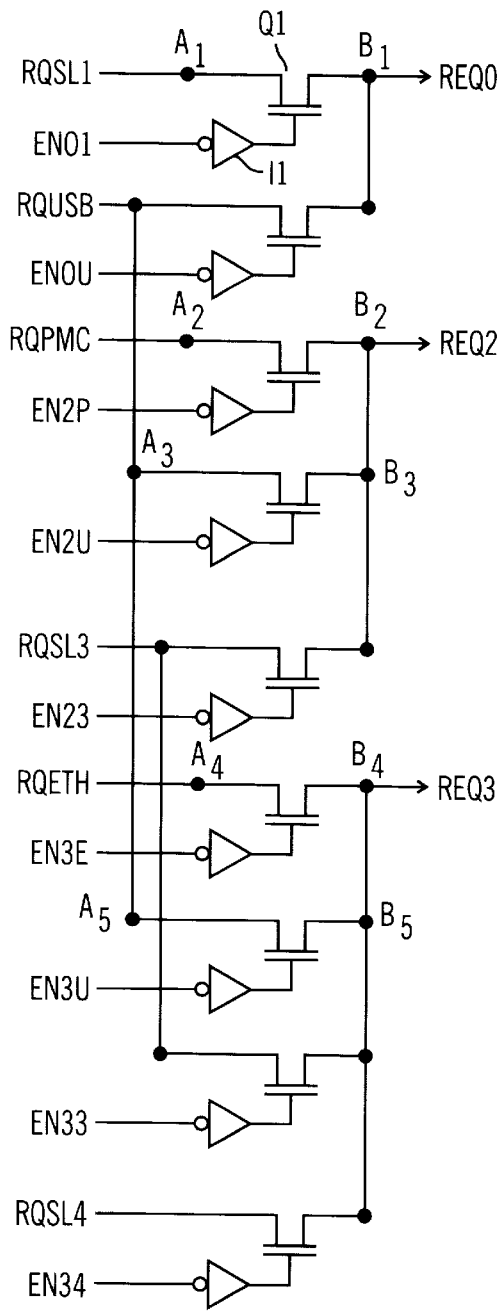
FIG. 2(*a*) is a circuit diagram showing in detail a portion of the bus master control line allocation unit of FIG. 1.
FIG. 2(b) is a circuit diagram showing in detail another portion of the bus master control line allocation unit of FIG. 1.
Figure 2B:
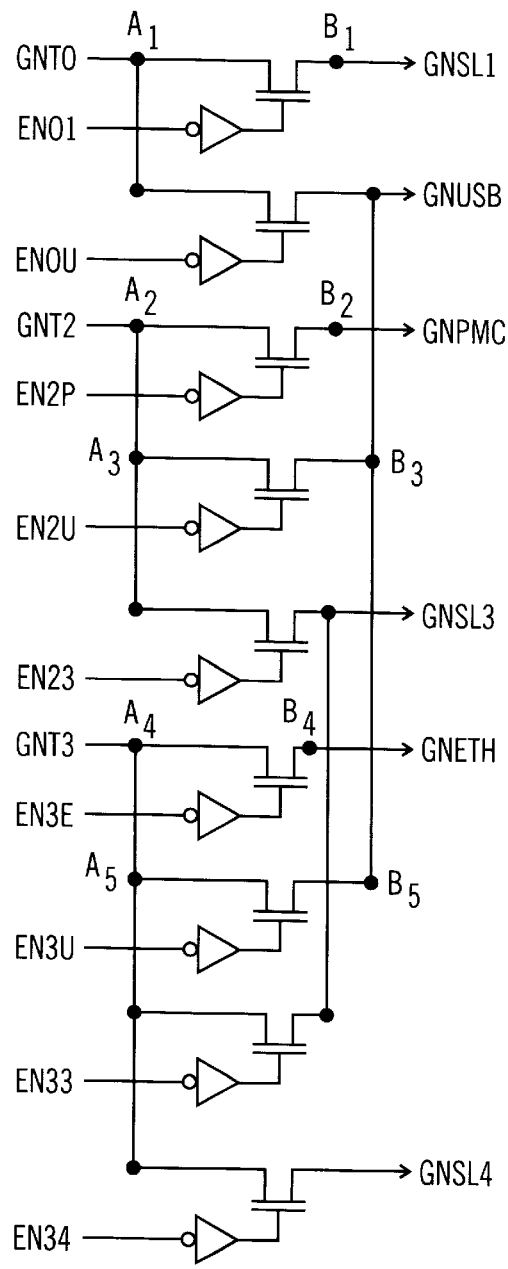

FIGS. 2(a) and 2(b) are circuit diagrams for the allocation control unit of FIG. 1, with FIG. 2(a) showing the request line allocation portion and FIG. 2(b) showing the grant line allocation portion of the unit. As shown, a set of N-channel FET switches Q is provided. Each FET (e.g., Q1) has one terminal connected to one of the request or grant lines (REQ0) from the logic control chip set and another terminal connected to the request or grant line (RQSL1) for one of the peripheral devices. A set of enable lines EN is provided, and each enable line (e.g., EN01) is connected to an inverter (I1). The output of each inverter is supplied to the control gate of one of the transistor switches (Q1) so that the corresponding enable signal can open or close the switch. In one preferred embodiment, the inverter-driven transistor switches are implemented using high performance cross-bar switches (e.g., SN74CBT3125D devices available from Texas Instruments Inc. of Dallas, Tex.), and the enable lines are driven by nine of the bits of two eight-bit shift registers.

The operation of the allocation control unit will now be explained. For each request/grant line pair, there is an (active low) enable line provided for each device that can be coupled to the line pair. At power up or reset, the BIOS (Basic Input/Output System) program in ROM determines which physical devices to couple to the individual request/grant line pairs and generates the corresponding enable signals. The actual allocation of the request/grant line pairs to the devices can be based on user-entered preferences and/or detected devices. The enable signal states necessary to direct a particular line pair to a particular device in the preferred embodiment are shown in the rows of Table 1. In the table, a "0" or "1" represents a required logic state and a "-" represents a don't care condition. Multiple rows can be selected as long as they do not create a conflict (i.e., require one enable signal to be in different logic states). In this manner, one of the request/grant line pairs is allocated to each device that is enabled in the present system configuration.

TABLE 1

|  | EN01 | EN0U | EN2P | EN2U | EN23 | EN3E | EN3U | EN33 | EN34 |
|---|---|---|---|---|---|---|---|---|---|
| GNT0 to: | | | | | | | | | |
| Slot 1 | 0 | 1 | — | — | — | — | — | — | — |
| USB | 1 | 0 | — | 1 | — | — | 1 | — | — |
| GNT2 to: | | | | | | | | | |
| PMC | — | — | 0 | 1 | 1 | — | — | — | — |
| USB | — | 1 | 1 | 0 | 1 | — | 1 | — | — |
| Slot 3 | — | — | 1 | 1 | 0 | — | — | 1 | — |
| GNT3 to: | | | | | | | | | |
| Ethernet | — | — | — | — | — | 0 | 1 | 1 | 1 |
| USB | — | 1 | — | 1 | — | 1 | 0 | 1 | 1 |
| Slot 3 | — | — | — | — | 1 | 1 | 1 | 0 | 1 |
| Slot 4 | — | — | — | — | — | 1 | 1 | 1 | 0 |

In further embodiments of the present invention, a PCI-to-PCI bridge (e.g., a DEC 21150 bridge available from Digital Equipment Corporation of Maynard, Mass.) is also connected to the PCI bus of the computer system. This allows additional PCI-based peripheral devices to be connected to the system on a second PCI bus that is coupled to the main PCI bus through the bridge device. In one embodiment in which such a bridge is provided in addition to the PCI devices of the preferred embodiment (see above), the second request/grant line pair (REQ1/GNT1) is hardwired directly to the PCI bridge, and the allocation of the other request/grant line pairs to the PCI slots is altered.

In particular, the third request/grant line pair (REQ2/GNT2) is connected to the second PCI slot, the USB port, or the mezzanine connecter; and the fourth request/grant line pair (REQ3/GNT3) is connected to the second PCI slot, the third PCI slot, the USB port, or the ethernet port. The necessary enable signal states for this embodiment are given in Table 1 when PCI slot 2 is substituted for rows labeled "Slot 3" and PCI slot 3 is substituted for rows labeled "Slot 4". The fourth PCI slot is not available for bus master devices in this configuration. Thus, one bus master slot is sacrificed in order to allow more peripheral devices to be connected to the system.

Additionally, pads for 0 ohm bypass resistors can be provided. Then, if a stripped down version of the computer system is desired (e.g., a system without USB support), bypass resistors can be installed to permanently allocate request/grant line pairs to specific devices. For example, bypass resistors could be connected between points $A_i$ and $B_i$ in FIGS. 2(a) and 2(b) to permanently allocate one or more of the request/grant line pairs to the corresponding devices.

As previously explained, the present invention provides a computer system in which bus master control lines can be dynamically allocated to connected peripheral devices. The bus request/grant line pairs of the system control logic and the line pairs for physical devices are selectively coupled based on enable signals. The system software operates to couple the bus master control lines to the appropriate devices in accordance with the present system configuration. That is, the request/grant line pairs can be re-allocated to different devices without making changes to the system board. Thus, if a device is not present, does not operate as a bus master, or is disabled, the request/grant line pairs can be dynamically allocated to other devices so that bus master control lines are not wasted by being directed to such a device. This provides much greater design flexibility by allowing for possible bus master operation by many different PCI devices.

The embodiments of the present invention described above relate to single board computer systems having a PCI bus. However, the dynamic bus master control line system of the present invention could be implemented in other types of computer systems and with other types of busses. Similarly, other types of line allocation logic with varying characteristics could be used for the allocation control unit of the present invention. Additionally, other design choices, such as the number and possible allocations of the bus master control lines, the number and types of connection slots and ports, and the supported peripheral devices could easily be adapted. Furthermore, embodiments of the present invention may not include all of the features described above.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A computer system comprising:

a system bus;

a plurality of peripheral devices having bus control lines, the peripheral devices being connected to the system bus;

bus control logic having a plurality of bus control lines for allowing bus master operation on the system bus; and an allocation control circuit connected to at least a first one of the bus control lines of the bus control logic and also connected to the bus control lines of at least two of the peripheral devices, wherein the allocation control circuit allocates the first bus control line of the bus control logic to a selected one of the at least two peripheral devices by coupling the first bus control line of the bus control logic to the bus control line of the selected peripheral device, so that the selected peripheral device can operate as a bus master on the system bus.

2. The computer system as defined in claim 1, wherein the allocation control circuit is controlled by system software.

3. The computer system as defined in claim 1, wherein the allocation control circuit includes a plurality of switches and each switch selectively couples one of the bus control lines of the bus control logic to the bus control line of one of the peripheral devices.

4. The computer system as defined in claim 1, wherein the first bus control line is a bus request line.

5. The computer system as defined in claim 1, wherein the peripheral devices include a universal serial bus port and an ethernet port.

6. The computer system as defined in claim 1, wherein one of the peripheral devices is a system bus-to-secondary bus bridge.

7. The computer system as defined in claim 3, wherein each switch is controlled by an enable signal, and states of the enable signals that control the switches are determined by system software.

8. The computer system as defined in claim 4, wherein the computer system is a single board computer system.

9. A computer system comprising:

a system bus;

a plurality of peripheral device connectors having bus control line connectors, each peripheral device connector allowing peripheral device connection to the system bus;

bus control logic having a plurality of bus control lines for allowing bus master operation on the system bus; and an allocation control circuit connected to at least a first one of the bus control lines of the bus control logic and also connected to the bus control line connectors of at least two of the peripheral device connectors, wherein the allocation control circuit allocates the first bus control line of the bus control logic to a selected one of the at least two peripheral device connectors by coupling the first bus control line of the bus control logic to the bus control line connector of the selected peripheral device connector, so that a peripheral device connected to the selected peripheral device connector can operate as a bus master on the system bus.

10. The computer system as defined in claim 9, wherein the allocation control circuit includes a plurality of switches and each switch selectively couples one of the bus control lines of the bus control logic to the bus control line connector of one of the peripheral device connectors.

11. The computer system as defined in claim 9, wherein the first bus control line is a bus request line.

12. The computer system as defined in claim 10,
wherein each switch is controlled by an enable signal, and
states of the enable signals that control the switches are determined by system software.

13. The computer system as defined in claim 11, wherein the computer system is a single board computer system.

14. A bus master control system for a bus, said system comprising:
bus control logic having at least one bus control line for allowing bus master operation on the bus;
an allocation control circuit connected to the bus control line of the bus control logic; and
at least two peripheral device connectors having bus control line connectors that are also connected to the allocation control circuit, each of the peripheral device connectors being connected to the bus,
wherein the bus control line of the bus control logic is not directly connected to any of the bus control line connectors of the peripheral devices, and
the allocation control circuit allocates the bus control line of the bus control logic to a selected one of the at least two peripheral device connectors by coupling the bus control line of the bus control logic to the bus control line connector of the selected peripheral device connector, so that a peripheral device connected to the selected peripheral device connector can operate as a bus master on the bus.

15. The system as defined in claim 14, wherein the allocation control circuit includes a plurality of switches, each of the switches selectively coupling the bus control line of the bus control logic to the bus control line connector of one of the peripheral device connectors based on a software-controlled enable signal.

16. The system as defined in claim 14, wherein the bus control line of the bus control logic is a bus request line.

17. The system as defined in claim 16, wherein the bus master control system is part of a single board computer system.

18. A method of allocating bus master control lines of a bus control logic circuit to a plurality of peripheral devices connected to a bus, said method comprising the steps of:
connecting the bus master control lines from the bus control logic circuit to an allocation unit;
connecting lines from at least two of the peripheral devices to the allocation unit;
determining which of the at least two peripheral devices to connect to which bus master control lines; and
directing the allocation unit to allocate each bus master control line from the bus control logic circuit to a selected one of the at least two peripheral devices by coupling the bus control line from the bus control logic to the line from the selected peripheral device, so that the selected peripheral device can operate as a bus master on the bus.

19. The method as defined in claim 18, wherein the step of determining is performed based on user preferences and/or system-detected peripheral devices.

20. The method as defined in claim 18, wherein in the step of directing, system software supplies a set of enable signals to the allocation unit to control which bus master control lines are coupled to which peripheral devices.

21. The method as defined in claim 18, wherein the bus is a PCI bus and the bus master control lines include bus request/grant line pairs.

22. The method as defined in claim 21, wherein the PCI bus is part of a single board computer system.

\* \* \* \* \*